(12) United States Patent
Huang (10) Patent No.: US 11,075,821 B2
(45) Date of Patent: Jul. 27, 2021

(54) METHOD AND APPARATUS FOR MANAGING FIELD DEVICE BASED ON CLOUD SERVER

(71) Applicants: KYLAND TECHNOLOGY CO., LTD, Beijing (CN); CoreTek Systems Incorporated, Beijing (CN)

(72) Inventor: Hang Huang, Beijing (CN)

(73) Assignee: KYLAND TECHNOLOGY CO., LTD., Beijing (CN)

( * ) Notice: Subject to any disclaimer, the term of this patent is extended or adjusted under 35 U.S.C. 154(b) by 631 days.

(21) Appl. No.: 15/887,888

(22) Filed: Feb. 2, 2018

(65) Prior Publication Data
US 2019/0116095 A1    Apr. 18, 2019

(30) Foreign Application Priority Data

Oct. 16, 2017   (CN) .......................... 201710960435.4

(51) Int. Cl.
*H04L 12/24* (2006.01)
*H04L 29/08* (2006.01)
*H04L 29/06* (2006.01)

(52) U.S. Cl.
CPC .......... *H04L 41/32* (2013.01); *H04L 41/0806* (2013.01); *H04L 67/025* (2013.01); *H04L 67/10* (2013.01); *H04L 67/141* (2013.01); *H04L 67/34* (2013.01); *H04L 67/42* (2013.01); *H04L 67/28* (2013.01)

(58) Field of Classification Search
None
See application file for complete search history.

(56) References Cited

U.S. PATENT DOCUMENTS

| 8,892,758 B2 | 11/2014 | Stoyanov et al. |
| 2007/0174521 A1 | 7/2007 | Aritomi |
| 2011/0125909 A1* | 5/2011 | Maes ............... H04L 65/1083 709/227 |

(Continued)

FOREIGN PATENT DOCUMENTS

| CN | 1744591 A | 3/2006 |
| CN | 202120267 A | 1/2012 |

(Continued)

*Primary Examiner* — Nasser M Goodarzi
*Assistant Examiner* — Terrika Peterson
(74) *Attorney, Agent, or Firm* — Arent Fox LLP; Michael Fainberg (57) ABSTRACT

The present disclosure provides a method and apparatus for managing a field device based on a cloud server. The method includes: obtaining, by a client, a list of devices from the cloud server, and selecting a target device to be managed from the list of devices; generating, by the client, a corresponding virtual device driver according to device information of the target device and configuring a driver parameter of the virtual device driver, and sending the driver parameter to an access server via the cloud server to trigger the access server to configure an interface of the target device according to the driver parameter; and determining, by the client, to establish a communication channel between the client and the target device upon reception of a configuration success message returned from the access server, and managing the target device according to the communication channel.

15 Claims, 5 Drawing Sheets

(56) References Cited

U.S. PATENT DOCUMENTS

| | | | |
|---|---|---|---|
| 2012/0081740 A1 | 4/2012 | Takagi et al. | |
| 2014/0115091 A1* | 4/2014 | Lee | H04L 67/10 |
| | | | 709/214 |
| 2014/0359704 A1 | 12/2014 | Chen | |
| 2015/0113172 A1 | 4/2015 | Johnson et al. | |
| 2016/0014088 A1* | 1/2016 | Maekawa | H04L 63/029 |
| | | | 726/12 |
| 2016/0188358 A1* | 6/2016 | Kim | G06F 13/105 |
| | | | 719/324 |
| 2016/0248668 A1* | 8/2016 | Lin | H04L 47/2475 |
| 2018/0262394 A1* | 9/2018 | Sakura | H04W 4/50 |
| 2019/0020723 A1* | 1/2019 | Kumar | H04L 67/28 |

FOREIGN PATENT DOCUMENTS

| | | |
|---|---|---|
| CN | 102447684 A | 5/2012 |
| CN | 104159061 A | 11/2014 |
| CN | 105262716 A | 1/2016 |
| CN | 105391719 A | 3/2016 |
| CN | 106200448 A | 12/2016 |
| CN | 107026954 A | 8/2017 |
| CN | 107045616 A | 8/2017 |
| CN | 107222637 A | 9/2017 |
| JP | 2007-220083 A | 8/2007 |
| WO | 2015119658 A1 | 8/2015 |

\* cited by examiner

METHOD AND APPARATUS FOR MANAGING FIELD DEVICE BASED ON CLOUD SERVER

CROSS-REFERENCE TO RELATED APPLICATIONS

This application claims the priority to Chinese Patent Application No. CN201710960435.4, filed on Oct. 16, 2017, the content of which is hereby incorporated by reference in its entirety.

FIELD

The present disclosure relates to the field of communications technology, particularly to a method and apparatus for managing a field device based on a cloud server.

BACKGROUND

Among existing technologies, a large number of networked devices implement address reuse through the Network Address Translator (NAT) technology. The NAT translates private addresses of multiple devices in a local area network (LAN), i.e., internal network addresses, into Internet addresses recognizable by the Internet, i.e., external network addresses, so that a device in the LAN can access the Internet by using the external network address. An NAT apparatus plays the role of address translation and internal network protection. However, a network device which accesses the Internet through the NAT cannot provide a service to an external network device that is, the external network device (including a device within another NAT LAN) cannot visit the network device inside the NAT LAN directly and a peer-to-peer (P2P) network needs to be established to pass through the NAT apparatus for interconnecting the networks.

Particularly, suppose a network device A is inside an LAN of an NAT A and a network device B is inside an LAN of an NAT B. The network device A and the network device B are interconnected by the following process: the network device A logs into a server via the NAT A, the NAT A assigns an external network port number to the network device A and uses the Internet address of the NAT A and the external network port number as the external network address of the network device A. Likewise, the network device B logs into the server via the NAT B and the Internet address of NAT B and an external network port number assigned to the network device B are used as the external network address of the network device B. Then the network device A and the network device B both may communicate with the server. When the network device A wants to send a message to the network device B directly, the network device A may obtain the external network address of the network device B from the server and initiate a session request to the NAT B by using the obtained external network address. However, after the session request from the network device A is received by the NAT B, the NAT B determines whether a correspondence relationship between the external network address of the network device A and a port number assigned to the network device A by the NAT B exists in the session request. If no existence of the correspondence relationship, the NAT B discards the session request. The session request is not required by the NAT B and thus the NAT B discards the session request received from the NAT A, that is, the network device B cannot receive the session request from the network device A. In this case, the network device A needs to send a request message to the server to request the server to send a message to the network device B to ask the network device B to initiate a session request to the network device A. After receiving the message from the server, the network device B sends the session request to the network device A. The NAT B saves the correspondence relationship between the external network address of the network device A and the port number assigned to the network device A by the NAT B, allows to receive a message from the network device A and informs the network device A via the server and the NAT A that the NAT B has opened a channel towards the network device A. The network device A sends a session request to the network device B again, the network device B responds to the session request from the network device A, and the NAT A stores a correspondence relationship between the external network address of the network device B and the port number assigned to the network device B by the NAT A. Then message transferring between the network device A and the network device B via the NAT A and NAT B is completed.

However, when using the above-mentioned method for data communication between network devices within different LANs the data transmission between the network devices has low security and is limited by network structures and firewalls, so connection success rate is low and it is inconvenient to manage data transmissions between various network devices as a whole. During development of hardware devices using the above-mentioned method, developers need to create a complex embedded hardware environment according to hardware interfaces of the hardware devices, thus resulting in low development efficiency.

In view of this challenge, a new method and apparatus for managing a field device based on a cloud server are needed to remedy the defects and shortcomings of existing technologies.

SUMMARY

An object of an embodiment of the disclosure is to provide a method and apparatus for managing a field device based on a cloud server, for solving the existing problems of low security of data transmission between network devices, low connection success rate and low development efficiency during development of hardware devices.

An embodiment of the present disclosure provides a method for managing a field device based on a cloud server. The method is applied to a device management system. The device management system at least includes several clients, an access server and a cloud server. The access server is configured to connect to real devices and register device information of the real devices with the cloud server. The cloud server is configured to maintain the device information of the real devices. The method includes the following operations: obtaining, by a client, a list of devices from the cloud server, and selecting a target device to be managed from the list of devices; where the list of devices includes the device information of real devices which connect to the cloud server via the access server; generating, by the client, a corresponding virtual device driver according to the device information of the target device and configuring a driver parameter of the virtual device driver, and sending the driver parameter to the access server via the cloud server to trigger the access server to configure an interface of the target device according to the driver parameter; and determining, by the client, to establish a communication channel between the client and the target device upon reception of a configuration success message returned from the access server, and managing the target device according to the communication channel.

Optionally, after selecting the target device to be managed from the list of devices by the client and before generating the corresponding virtual device driver according to the device information of the target device by the client, the method further includes determining, by the client, a current state of the target device. The current state of a real device indicates whether the real device is selected and managed by another client.

Optionally, obtaining the list of devices from the cloud server by the client particularly includes: logging, by the client into the cloud server; and sending, by the client, a request for a list of devices to the cloud server to trigger the cloud server to perform the following operations: verifying validation of the client and sending to the client the device information of each real device which is connected to the cloud server via the access server and the client has right to manage when determining that the client is valid.

Optionally, generating, by the client, the corresponding virtual device driver according to the device information of the target device particularly includes generating, by the client, the corresponding virtual device driver of the target device at least according to an interface type of and an interface number of the target device.

Optionally, configuring, by the client, the driver parameter of the virtual device driver particularly includes configuring, by the client, a baud rate of a serial interface of the virtual device driver corresponding to the target device when determining that the interface type of the target device is the serial interface.

Optionally, configuring, by the client, the driver parameter of the virtual device driver particularly includes: configuring, by the client, an Internet Protocol (IP) address of a network card of the virtual device driver corresponding to the target device when determining that the interface type of the target device is the network card.

Optionally, sending, by the client, the driver parameter to the access server via the cloud server to trigger the access server to configure the interface of the target device according to the driver parameter particularly includes: encapsulating, by the client, the driver parameter according to a private protocol to obtain an encapsulated driver parameter, and sending the encapsulated driver parameter to the access server via the cloud server to trigger the access server to perform the following operations: decapsulating the received encapsulated driver parameter according to the private protocol to obtain the driver parameter, and configuring an interface in the access server which is connected to the target device according to the driver parameter.

Optionally, the method further includes: establishing, by the client, communication channels between the client and at least two target devices, respectively; and implementing, by the client, data communications between any two of the at least two target devices based on the communication channels of the at least two target devices.

The embodiment of the present disclosure also provides an apparatus for managing a field device based on a cloud server. The apparatus includes a selecting unit, a generating unit and a managing unit. The selecting unit is configured to obtain a list of devices from the cloud server and select a target device to be managed from the list of devices. The list of devices includes device information of real devices connected to the cloud server via an access server. The generating unit is configured to generate a corresponding virtual device driver according to the device information of the target device, configure a driver parameter of the virtual device driver, and send the driver parameter to the access server via the cloud server to trigger the access server to configure an interface of the target device according to the driver parameter. The managing unit is configured to determine to establish a communication channel between the apparatus and the target device upon reception of a configuration success message returned from the access server, and manage the target device according to the communication channel.

Optionally, after selecting the target device to be managed from the list of devices and before generating the corresponding virtual device driver according to the device information of the target device, the selecting unit is further configured to determine a current state of the target device; where the current state of a real device indicates whether the real device is selected and managed by another apparatus.

Optionally, when obtaining the list of devices from the cloud server, the selecting unit is particularly configured to log into the cloud server and send a request for the list of devices to the cloud server to trigger the cloud server to perform the following operations: verifying validation of the apparatus and sending to the apparatus the device information of each real device which is connected to the cloud server via the access server and which the apparatus has right to manage when determining that the apparatus is valid.

Optionally, when generating the corresponding virtual device driver according to the device information of the target device, the generating unit is particularly configured to generate the corresponding virtual device driver of the target device at least according to an interface type of and an interface number of the target device.

Optionally, when configuring the driver parameter of the virtual device driver, the generating unit is particularly configured to configure a baud rate of a serial interface of the virtual device driver corresponding to the target device when the apparatus determines that the interface type of the target device is the serial interface.

Optionally, when configuring the driver parameter of the virtual device driver, the generating unit is particularly configured to configure an Internet Protocol (IP) address of a network card of the virtual device driver corresponding to the target device when the apparatus determines that the interface type of the target device is the network card.

Optionally, when sending the driver parameter to the access server via the cloud server to trigger the access server to configure the interface of the target device according to the driver parameter, the selecting unit is particularly configured to encapsulate the driver parameter according to a private protocol to obtain an encapsulated driver parameter and send the encapsulated driver parameter to the access server via the cloud server to trigger the access server to perform the following operations: decapsulating the received encapsulated driver parameter according to the private protocol to obtain the driver parameters and configuring an interface in the access server which is connected to the target device according to the driver parameter.

Optionally, the managing unit is further configured to establish communication channels between the apparatus and at least two target devices, respectively, and implement data communication between any two of the at least two target devices based on the communication channels of the at least two target devices.

The embodiment of the disclosure also provides a computing device. The computing device includes a transmitter, a processor, and a memory storing at least one instruction.

The processor is configured to execute the at least one instruction to: obtain a list of devices from a cloud server; select a target device to be managed from the list of devices; where the list of devices includes device information of real devices connected to the cloud server via an access server; generate a corresponding virtual device driver according to the device information of the target device; configure a driver parameter of the virtual device driver; control the transmitter to send the driver parameter to the access server via the cloud server to trigger the access server to configure an interface of the target device according to the driver parameter; determine to establish a communication channel between the computing device and the target device upon reception of a configuration success message returned from the access server, and manage the target device according to the communication channel.

The embodiment of the disclosure also provides a non-transitory computer storage medium. The non-transitory computer storage medium stores at least one instruction. When the at least one instruction is executed by a computer, the at least one instruction causing the computer to: obtain a list of devices from a cloud server, and select a target device to be managed from the list of devices; where the list of devices includes device information of real devices which connect to the cloud server via an access server; generate a corresponding virtual device driver according to the device information of the target device and configure a driver parameter of the virtual device driver, and send the driver parameter to the access server via the cloud server to trigger the access server to configure an interface of the target device according to the driver parameter; and determine to establish a communication channel between the computer and the target device upon reception of a configuration success message returned from the access server, and manage the target device according to the communication channel.

Optionally, when the at least one instruction is executed by the computer, the at least one instruction further causes the computer to: after selecting the target device to be managed from the list of devices and before generating the corresponding virtual device driver according to the device information of the target device, determine a current state of the target device. The current state of a real device indicates whether the real device is selected and managed by a device other than the computer.

Optionally, when the at least one instruction is executed by the computer, the at least one instruction further causes the computer to: log into the cloud server; and send a request for a list of devices to the cloud server to trigger the cloud server to perform the following operations: verifying validation of the computer and sending to the computer the device information of each real device which is connected to the cloud server via the access server and the computer has right to manage when determining that the computer is valid.

Optionally, when the at least one instruction is executed by the computer, the at least one instruction further causes the computer to: generate the corresponding virtual device driver of the target device at least according to an interface type of and an interface number of the target device.

Optionally, when the at least one instruction is executed by the computer, the at least one instruction further causes the computer to: configure a baud rate of a serial interface of the virtual device driver corresponding to the target device when determining that the interface type of the target device is the serial interface.

Optionally, when the at least one instruction is executed by the computer, the at least one instruction further causes the computer to: configure an Internet Protocol (IP) address of a network card of the virtual device driver corresponding to the target device when determining that the interface type of the target device is the network card.

Optionally, when the at least one instruction is executed by the computer, the at least one instruction further causes the computer to: encapsulate the driver parameter according to a private protocol to obtain an encapsulated driver parameter, and send the encapsulated driver parameter to the access server via the cloud server to trigger the access server to perform the following operations: decapsulating the received encapsulated driver parameter according to the private protocol to obtain the driver parameter, and configure an interface in the access server which is connected to the target device according to the driver parameter.

Optionally, when the at least one instruction is executed by the computer, the at least one instruction further causes the computer to: establish communication channels between the computer and at least two target devices, respectively; and implement data communications between any two of the at least two target devices based on the communication channels of the at least two target devices.

DETAILED DESCRIPTION

Among existing technologies, when two network devices such as a real device and a client inside different internal networks communicate data via the Internet, NAT apparatuses corresponding to each of the network devices need to assign an external network port number to the network devices respectively in advance, and to establish a communication channel between the two network devices via a server by using Transmission Control Protocol (TCP) tunneling technologies, so as to implement interconnection of the two network devices. However, the above described device interconnection method is usually limited by factors such as the type of the NAT apparatuses, the structures of the networks and firewalls, so the connection success rate is low. Furthermore, after the communication channel is established between the two network devices by using TCP tunneling technologies, subsequent data communication between the two network devices is implemented via the established communication channel, without having to go through the server, and thus the data communication between the two network devices lacks control and management by the server.

Therefore, in order to solve the existing problem of low security of data transmission between network devices, low connection success rate and low development efficiency during development of hardware devices, the present disclosure provides a new method and apparatus for managing a field device based on a cloud server. The method includes the following operations: obtaining, by a client, a list of devices from the cloud server and selecting a target device to be managed from the list of devices, where the list of devices includes device information of real devices connected with the cloud server via an access server; generating, by the client, a corresponding virtual device driver according to the device information of the target device and configuring a driver parameter of the virtual device driver; sending the driver parameter to the access server via the cloud server and triggering the access server to configure an interface of the target device according to the driver parameter; determining, by the client, to establish a communication channel between the client and the target device upon reception of a configuration success message returned from the access server, and managing the target device according to the communication channel.

Technical solutions of the embodiment of the present disclosure are described clearly and completely below with reference to accompanying drawings. Obviously, the embodiment described herein is only one of the embodiments of the present disclosure. Based on the embodiment of the present disclosure described herein, all other embodiments obtained by those skilled in the art without creative effort fall into the scope of protection of the present disclosure.

Figure 1:
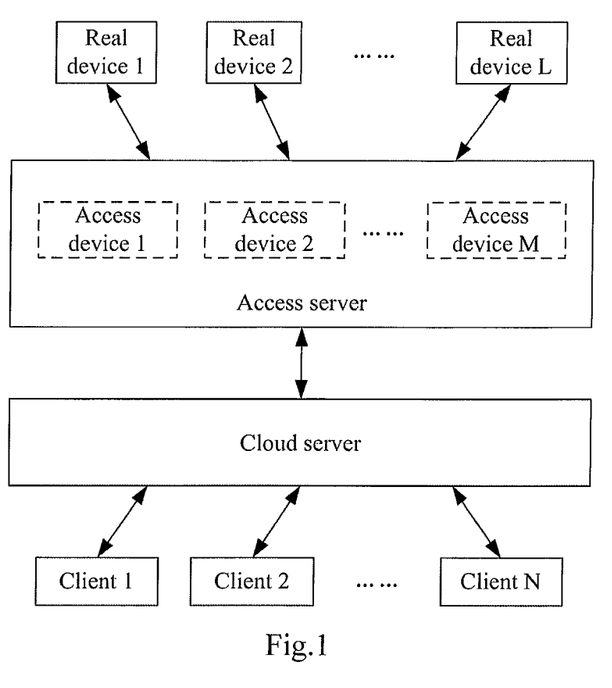
FIG. 1 is a structural diagram of a system for managing a field device based on a cloud server according to an embodiment of the present disclosure.

As illustrated by FIG. 1, in an embodiment of the present disclosure, a system for managing a real device such as an embedded hardware device at least includes several clients, a cloud server, an access server and several real devices. The access server includes several access devices. The real devices are connected to the access server, the cloud server are connected with the access server and the clients.

In practice, the embedded hardware devices, which need to be debugged and managed, are placed in a cloud server lab in advance. The cloud server lab at least includes a cabinet. At least the multiple embedded hardware devices, the access server and the cloud server are integrated in the cabinet, an access server and a cloud server. The embedded hardware devices are connected to the cloud server via the access server and device information and state information of the connected devices is maintained in the cloud server. The cloud server makes the embedded intelligent devices available to the clients according to a private protocol and different permission of the different clients. After a user logs into the cloud server through a client, the client sends a request for a list of devices to the cloud server, and obtains the list of all embedded hardware devices made available to that client by the cloud server. Then the client selects a target device to be operated from the list of the devices and creates a virtual device driver corresponding to the target device according to device information of the target device, which is included in the list of the devices. The client initializes a driver parameter of the virtual device driver, encapsulates the driver parameter according to a private protocol, and transmits the encapsulated driver parameter to the access server via the cloud server. The access server decapsulates the received encapsulated driver parameter according to the private protocol to obtain the corresponding driver parameter and configures the target device by using the driver parameter. After the configuration is completed, a configuration success message is sent to the client from the cloud server. After having received the configuration success message from the access server, the client determines to establish a communication channel between the client and the device. During a subsequent communication process, data communication between the client and the target device is implemented via the communication channel.

In the embodiment of the present disclosure, an interface of the real device such as the embedded hardware device could be converted to an interface of a virtual hardware device by software to access the Internet and to be managed by the user. The user may remotely invoke the embedded hardware device via the client to manipulate power-on, power-off and restart of the embedded hardware device, and to operate a virtual online burning device (for example, BDI2000 and BDI3000).

The system for managing the embedded hardware devices is a solution to interconnection and embedded computing power servitization of the embedded devices and is incorporated with principles of cloud computing and virtualization technologies. The access server manages peripheral interfaces of the embedded devices and uses a set of peripheral interfaces of the embedded hardware devices as a basic unit of a computing service. A peripheral interface of the target device is restored by the virtual device driver in the client.

The solutions of the present disclosure are described below in detail in connection with particular implementations. Of cause, the present disclosure is not limited to the following implementations.

Figure 2:
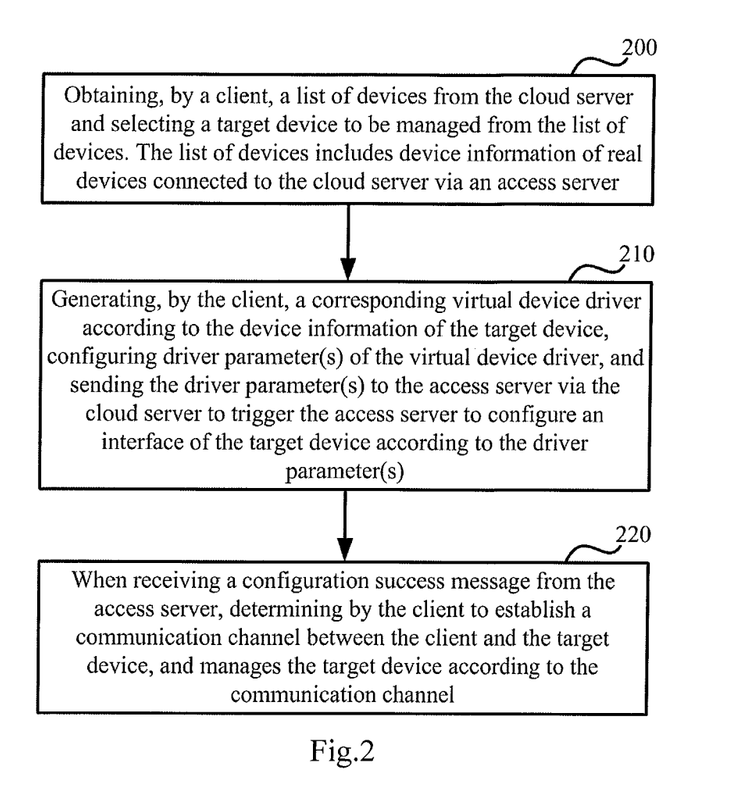
FIG. 2 is a flow chat of a method for managing a field device based on a cloud server according to the embodiment of the present disclosure.

As illustrated by FIG. 2, in the embodiment of the present disclosure, a detailed flow of a method for managing a field device based on a cloud server includes the following operations.

Operation 200: obtaining, by a client, a list of devices from the cloud server and selecting a target device to be managed from the list of devices. The list of devices includes device information of real devices connected to the cloud server via an access server.

In practice, before the list of devices is obtained by the client from the cloud server, a large number of real devices (for example, embedded hardware devices) may be connected to the cloud server via the access server. The device information of connected real devices (such as identification information, interface types and interface numbers of real devices) is saved in the cloud server. A user may use a login account to log into the cloud server via the client, and the cloud server configures administrative rights for each client/login account according to a private protocol, that is, different administrative rights for the real devices are made available to different clients/login accounts.

Figure 3:
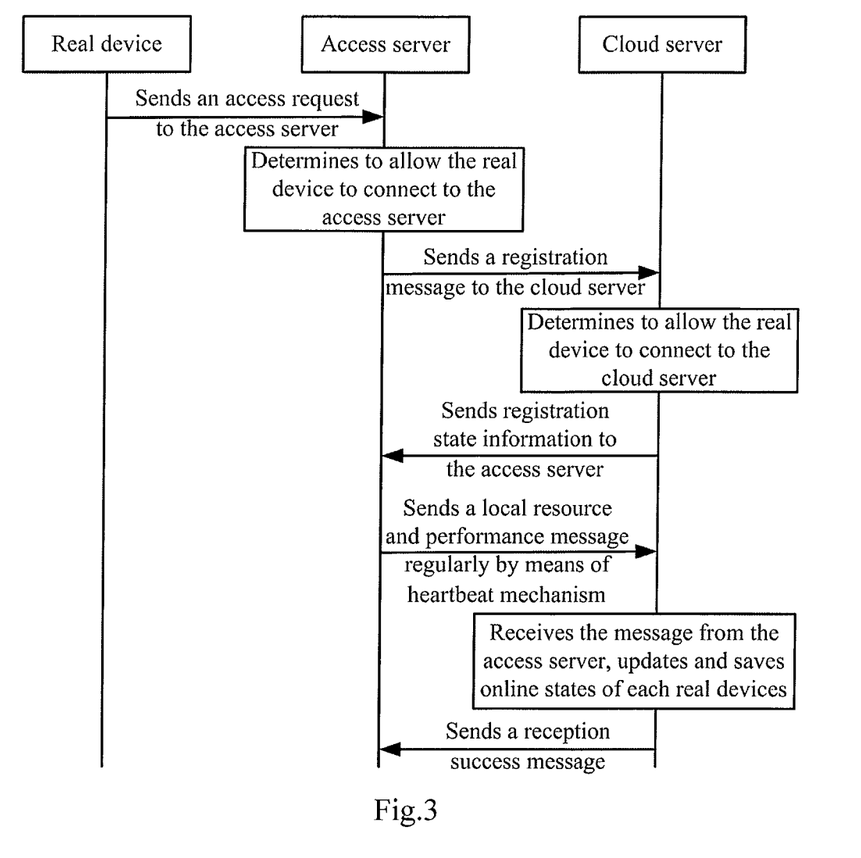
FIG. 3 is a flow chat of a real device connecting to a cloud server via an access server according to the embodiment of the present disclosure.

Particularly, FIG. 3 is a detailed flow chat of how a real device is connected to the cloud server via the access server according to the embodiment of the present disclosure. The real device send an accessing request to the access server, the access server determines whether to allow the real device to connect to the access server according to the device information of the real device. If the result is yes, the real device is connected to the access server and the access server sends a registration message to the cloud server. The cloud server determines whether to allow the real device to connect to the cloud server, and if the result is yes, the real device is connected to the cloud server, and the cloud server sends registration state information to the access server. Then the accessing process of the real device is completed. Furthermore, communication of state information between the access server and the cloud server may be maintained by means of heartbeat mechanism, i.e., a local resource and performance message (such as a message indicating online states of connected real devices) is regularly sent form the access server to the cloud server. The cloud server maintains information of the online states of the connected real devices according to the local resource and performance message from the access server, and returns a reception success message to the access server.

Particularly, according to the embodiment of the present disclosure, when operation 200 is performed, the client logs into the cloud server and sends a request for the list of devices to the cloud server to trigger the cloud server to perform the following operations: verifying the validation of the client, and when determining that the client is valid, sending to the client the device information of real devices which are connected to the could server via the access server and the client is authorized to manage. The client selects a target device to be managed from the list of devices.

For example, suppose a real device 1, a real device 2, a real device 3, . . . , and a real device n are connected to the cloud server via the access server. The cloud server maintains a list of devices including the real device 1, the real device 2, the real device 3, . . . , and the real device n. Among the administrative rights preset for each client by the cloud server, a client 1 has right to manage the real device 1 and the real device 2, and a client 2 has right to manage the real device 2, the real device 3 and the real device 4. Therefore, the client 1 logs into the cloud server and sends a request for a list of devices to the cloud server. The cloud server verifies the validation of the client 1, and after having determined that the client 1 is valid, sends the list of devices containing device information of the real device 1 and the real device 2 to the client 1. The client 2 logs into the cloud server and sends a request for a list of devices to the cloud server. The cloud server verifies the validation of the client 2, and after having determined that the client 2 is valid, the list of devices containing device information of the real device 2, the real device 3 and the real device 4 to the client 2.

Furthermore, in the embodiment of the present disclosure, after having selected a target device to be managed from the list of devices and before generating a corresponding virtual device driver according to the device information of the target device, the client needs to determine current state of the device. The current state of a real device indicates whether the real device has been selected and managed by another client.

Because one real device cannot be invoked by two clients at the same time, when being requested for the target device by the client according to the list of devices sent from the cloud server, the cloud server needs to determine whether the target device is invoked by another client, that is, to determine the current state of the target device. Only when the cloud server determines that the target device is available (that is, the target device is online and is not invoked by any other client), a further operation may be continued.

Operation 210: generating, by the client, a corresponding virtual device driver according to the device information of the target device, configuring driver parameter(s) of the virtual device driver, and sending the driver parameter(s) to the access server via the cloud server to trigger the access server to configure an interface of the target device according to the driver parameter(s).

Particularly, in the embodiment of the present disclosure, when the operation 210 is performed, the client generates the virtual device driver corresponding to the target device and configures the driver parameter(s) of the virtual device driver at least according to the interface type and the interface number of the target device.

Of cause, in the embodiment of the present disclosure, as different types of target devices may have different types of interface, the client configures the driver parameter(s) of the virtual device driver according to but not limited to any of the following scenarios.

In a first scenario, the client configures a baud rate of a serial interface of the virtual device driver corresponding to the target device if it determines that the interface type of the target device is a serial interface.

For example, suppose the interface type of the target device 1 selected by the client 1 to manage is a serial interface, and the interface type of the corresponding virtual device driver 1 is also serial, then when the client 1 configures the driver parameter(s) of the virtual device driver 1 corresponding to the target device 1, it configures the baud rate of the interface of the virtual device driver 1 to be 96000 bit/s.

In the embodiment of the present disclosure, driver parameter(s) of a virtual device driver corresponding to a target device whose interface type is a serial interface is configured according to device information of the target device. According to the device information of the target device, the driver parameter(s) of the virtual device driver corresponding to the target device may be configured to a baud rate most suitable for communication of the target device. Of cause, the driver parameter(s) of the virtual device driver corresponding to the target device may be customized according to a user's demand.

In a second scenario, if the client determines that the interface type of the target device is a network card, the client configures an IP address of the network of the virtual device driver corresponding to the target device.

For example, suppose the interface type of the target device 2 selected by the client 1 to manage is a network card, the interface type of the corresponding virtual device driver 2 is also a network card, then when the client 1 configures the driver parameter(s) of the virtual device driver 2 corresponding to the target device 2, the client 1 configures the IP address of the network card of the virtual device driver 2 to be 172.163.1.1, where the IP address of the target device 2 is 172.163.1.1.

In the embodiment of the present disclosure, an IP address of a network card of a virtual device driver corresponding to a target device may be configured to be within the same sub-net segment as an IP address of the target device, so that an address of an interface in the access server and connected to the target device is configured to be within the same sub-net segment as the IP address of the target device.

In the embodiment of the present disclosure, after having configured the driver parameter(s) of the virtual device driver, the client encapsulates the driver parameter(s) according to a private protocol to obtain encapsulated driver parameter(s), and sends the encapsulated driver parameter(s) to the access server via the cloud server, so as to trigger the access server to perform the following operations: decapsulating the received encapsulated driver parameter(s) according to the private protocol to obtain the driver parameter(s), and configuring the interface connected with the target device in the access server according to the driver parameter(s).

In the embodiment of the present disclosure, after having configured the driver parameter(s) and before transmitting the driver parameter(s) to the access server via the Internet, the client encapsulates the driver parameter(s) according to the specified private protocol. After having received the encapsulated driver parameters, the access server also needs to decapsulate the encapsulated driver parameter(s) according to the specified private protocol to obtain the corresponding driver parameter(s). In this way, the security of the data transmission is guaranteed.

Operation 220: when receiving a configuration success message from the access server, determining by the client to establish a communication channel between the client and the target device, and manages the target device according to the communication channel.

In the embodiment of the present disclosure, after having determined to establish the communication channel between the client and the target device, the client communicates data through the established communication channel directly during subsequent data interaction processes between the client and the target device.

In practice, a user may remotely invoke any of the real devices placed in the cloud server lab which the user has right to invoke through the client. Therefore, when a real device needs to be debugged/tested, a complex hardware testing environment is no longer required to be created according to an hardware interface of the real device; instead, it is only needed to implement a communication channel via which the client and the real device could communication directly by creating a virtual device driver corresponding to the real device according to device information of the real device, and configuring a corresponding interface in the access server configured to connect to the real device through configuring driver parameter(s) of the virtual device driver.

Furthermore, the client establishes communication channels between the client and at least two target devices, respectively, and implements data communication between any two of the at least two target devices based on the established communication channels.

For example, suppose the client 1 establishes a communication channel 1 between the client 1 and the target device 1, and establishes a communication channel 2 between the client 1 and the target device 2. Then the client 1 may perform data interaction with the target device 1 via the communication channel 1, and with the target device 2 via the communication channel 2. After having obtained data 1 from the target device 1 via the communication channel 1, the client 1 may send the data 1 to the target device 2 via the communication channel 2. Likewise, after having obtained data 2 from the target device 2 via the communication channel 2, the client 1 may send the data 2 to the target device 1 via the communication channel 1. As a result, interconnection between the target device 1 and the target device 2 is implemented via the client 1.

Figure 4:
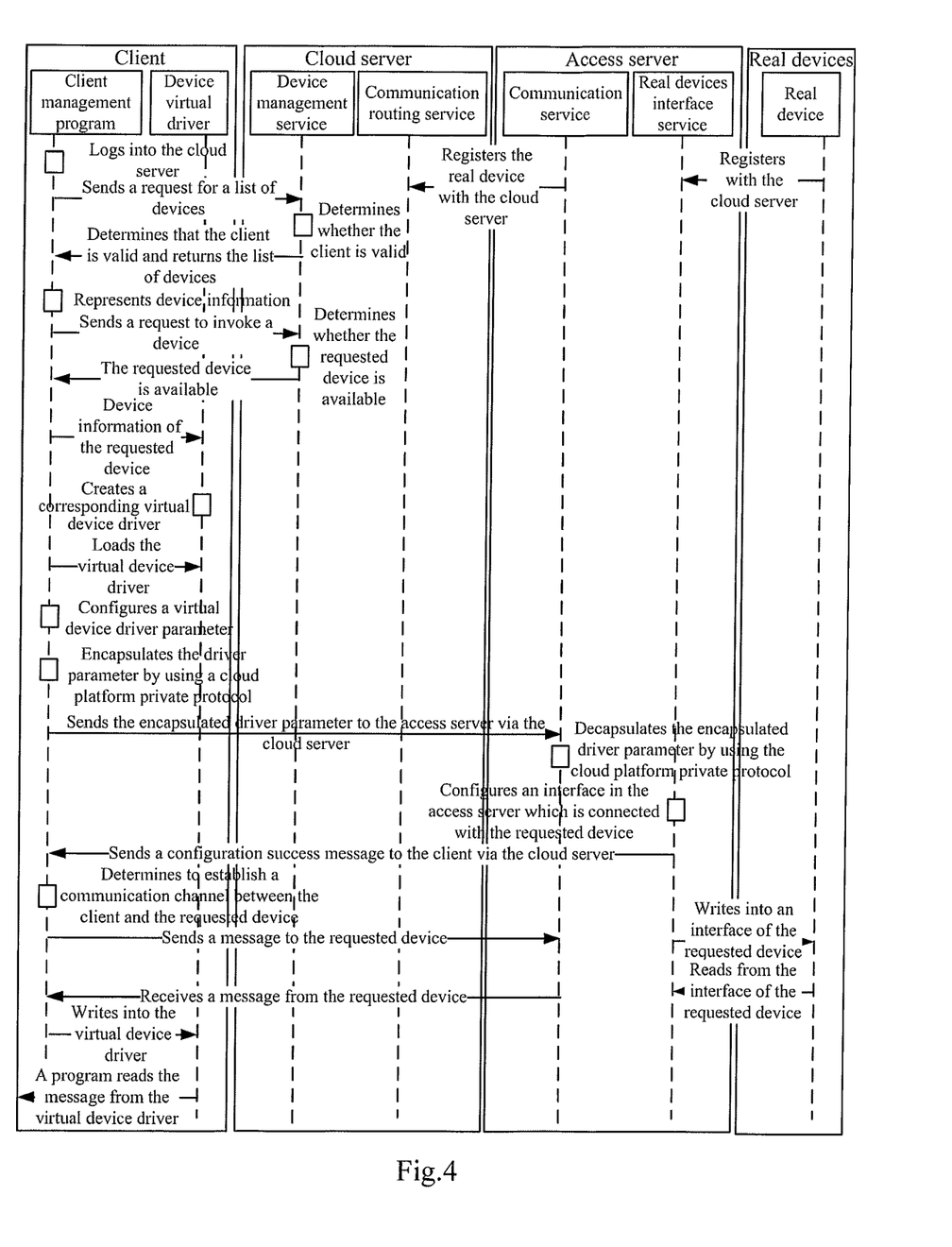
FIG. 4 is a flow chat of establishing a communication channel between a client and a real device according to the embodiment of the present disclosure.

The embodiment of the present disclosure is described below in further detail in a particular disclosure scenario. As illustrated by FIG. 4, in the embodiment of the present disclosure, a specific flow chat of establishing a communication channel between a client and a real device is as follows.

A real device is registered with a cloud server via an access server. A user logs into the cloud server via the client and sends a request for a list of devices to the cloud server. When the cloud server receives the request for the list of devices from the client, the cloud server determines whether the client is a valid client. If the client is determined to be valid, the list of available devices is returned to the client. After having received the list of available devices, the client presents the user with device information of each device in the list of available devices. The client sends a request to invoke a device in the list of available devices to the cloud server, and the cloud server determines whether the requested device is available. If the determination result is yes, the cloud server sends a message indicating that the requested device is available to the client. The client creates a virtual device driver corresponding to the requested device according to the device information of the requested device, configures corresponding driver parameter(s), encapsulates the driver parameter(s) according to a preset private protocol, and sends the encapsulated driver parameter(s) to the access server via the cloud server. After having received the encapsulated driver parameter(s), the access server decapsulates the encapsulated driver parameter(s) according to the preset private protocol to obtain the corresponding driver parameter(s), and configures a local interface in the access server configured to connect to the requested device by using the driver parameter(s). After having completed the configuration, the access server sends a configuration success message to the client through the cloud server. After having received the configuration success message, the client determines to establish a communication channel between the client and the requested device. Furthermore, during subsequent data interaction between the client and the requested device, the client sends a message to the requested device via the established communication channel, the access server writes the message into an interface of the requested device and the client completes sending the message to the requested device. The access server reads a message from the interface of the requested device, sends the read message to the client via the established communication channel, and the client completes the reception of the message from the requested device.

In practice, the system for managing the real device is developed based on Windows Communication Foundation (WCF). The client establishes the direct communication channel to the interface between the client and the interface in the access server configured to connect to the real device, could particularly be, the client establishes a WCF channel between the client and the interface in the access server for connecting to the real device, that is, there exists a WCF service in the access server which the client can directly access.

The WCF is a part of the .NET framework, which is a series of disclosure frameworks supporting data communication and developed by Microsoft.

Figure 5:
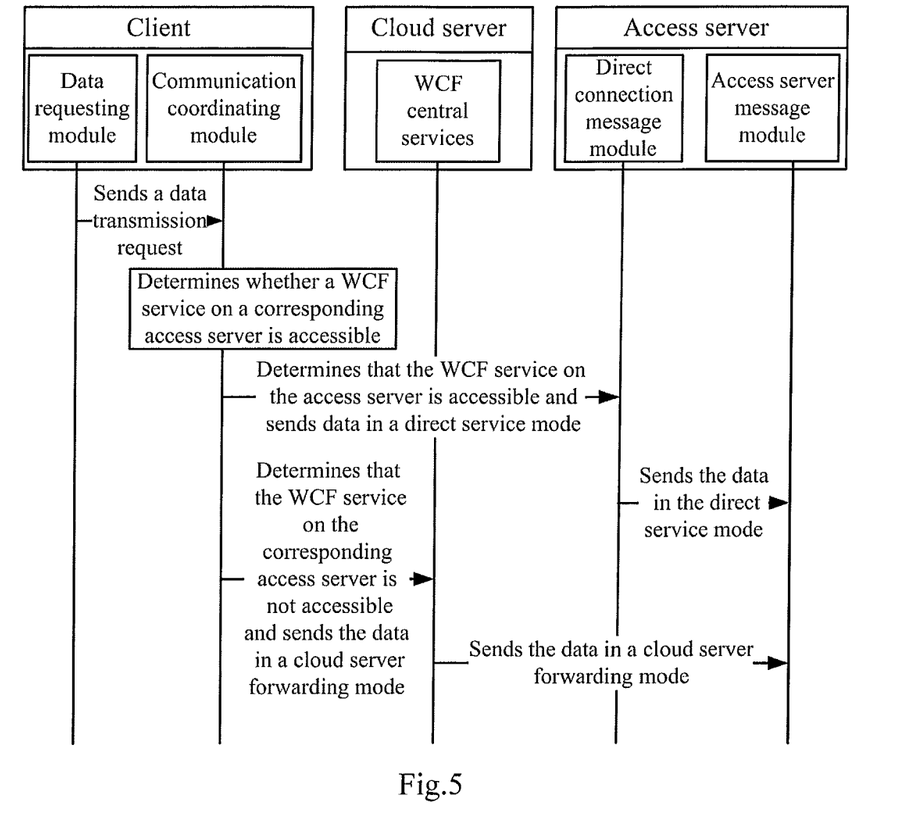
FIG. 5 is a diagram illustrating data interaction between a client and an access server according to the embodiment of the present disclosure.

Optionally, FIG. 5 is a diagram illustrating data interaction between a client and an access server according to the embodiment of the present disclosure. A data requesting module in the client sends a data transmission request to a communication coordinating module in the client. The communication coordinating module in the client determines whether a WCF service on a corresponding access server is accessible. If the communication coordinating module in the client determines that the WCF service on the access server is accessible, it sends data in a direct service mode, that is, the communication coordinating module in the client sends the data to a direct connection message module in the access server. The direct connection message module in the access server sends the received data to an access server message module the access server. If the communication coordinating module in the client determines that the WCF service on the corresponding access server is not accessible, it sends the data in a cloud server forwarding mode, that is, the communication coordinating module in the client sends the data to a cloud server, and the cloud server sends the received data to the access server message module in the access server.

Figure 6:
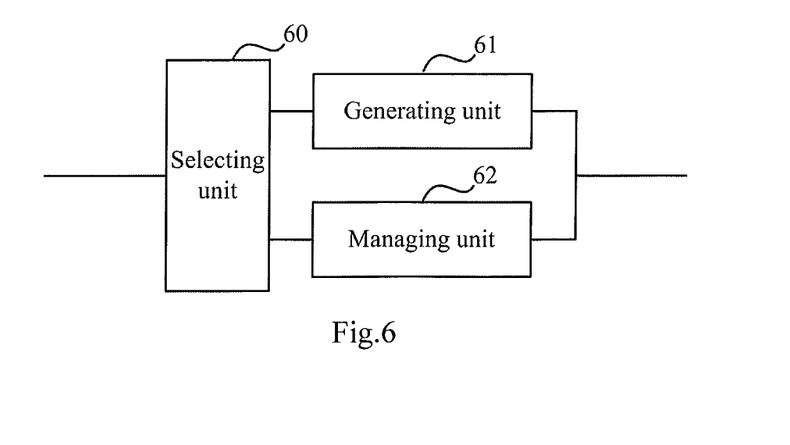
FIG. 6 is a structural diagram of an apparatus for managing a field device based on a cloud server according to the embodiment of the present disclosure.

Based on the above-mentioned embodiment, as illustrated by to FIG. 6, the embodiment of the present disclosure also provides an apparatus for managing a field device based on a cloud server. The apparatus at least includes a selecting unit 60, a generating unit 61 and a managing unit 62.

The selecting unit 60 is configured to obtain a list of devices from the cloud server, and select a target device to be managed from the list of devices; where the list of devices includes device information of real devices connected to the cloud server via the access server.

The generating unit 61 is configured to generate a corresponding virtual device driver according to the device information of the target device, configure driver parameter(s) of the virtual device driver, and send the driver parameter(s) to the access server via the cloud server, to trigger the access server to configure an interface of the target device according to the driver parameter(s).

The managing unit 62 is configured to determine to establish a communication channel with the target device upon reception of a configuration success message returned from the access server, and then manage the target device according to the communication channel.

Optionally, after having selected the target device to be managed from the list of devices and before generating a corresponding virtual device driver according to the device information of the target device, the selecting unit 60 is further configured to determine the current state of the target device; where the current state of a real device indicates whether the real device has been selected and managed by another apparatus.

Optionally, when obtaining the list of devices from the cloud server, the selecting unit 60 is specifically configured to: log into the cloud server; and send a request for the list of devices to the cloud server to trigger the cloud server to perform the following operations: verifying the validation of the apparatus, and return to the apparatus the device information of real devices which are connected to the cloud server via the access server and which the apparatus has right to manage if the selecting unit 60 determines that the client is valid.

Optionally, when generating the corresponding virtual device driver according to the device information of the target device, the generating unit 61 is particularly configured to: generate the corresponding virtual device driver of the target device at least according to an interface type and an interface number of the target device. When configuring the driver parameter(s) of the virtual device driver, the generating unit is particularly configured to: configure a baud rate of a serial interface of the virtual device driver corresponding to the target device if the apparatus determines that the interface type of the target device is the serial interface; or, configure an IP address of a network card of the virtual device driver corresponding to the target device if the apparatus determines that the interface type of the target device is the network card.

Optionally, when the driver parameter(s) is sent to the access server via the cloud server to trigger the access server to configure the interface of the target device according to the driver parameter(s), the generating unit 61 is particularly configured to: encapsulate the driver parameter(s) according to a private protocol to obtain encapsulated driver parameter(s), and send the encapsulated driver parameter(s) to the access server via the cloud server to trigger the access server to perform the following operations: decapsulating the received encapsulated driver parameter(s) according to the private protocol to obtain the driver parameter(s), and configure the interface in the access server which is connected to the target device according to the driver parameter(s).

Optionally, the managing unit 62 is further configured to: establish communication channels with at least two target devices, respectively and implement data communication between any two of the at least two target devices based on the communication channels of the at least two target devices.

In summary, in the embodiment of the present disclosure, during the process of device management, the client obtains the list of devices from the cloud server and selects the target device to be managed from the list of devices; where the list of devices includes the device information of real devices which connect to the cloud server via the access server; the client generates the corresponding virtual device driver according to the device information of the target device, sets the driver parameter(s) of the virtual device driver, and sends the driver parameter(s) to the access server via the cloud server to trigger the access server to configure the interface of the target device according to the driver parameter(s). The client determines to establish a communication channel between the client and the target device upon reception of a configuration success message returned from the access server, and then manages the target device according to the communication channel.

By using the foregoing methods, the client and the physical device need to perform data interaction through the cloud server, so that data interaction between the client and the physical device can be controlled and managed by the cloud server, and thus the security of data interaction between the client and the real device is guaranteed. By creating the virtual driver corresponding to the real device, the establishment of the communication channel between the client and the real device is no longer limited by network structures and configurations of firewalls, thus increasing the connection success rate between the client and the real device. The client can comprehensively monitor processes of data communication between the client and various real device and the user may remotely invoke a real device to be tested through the client, so it is no longer required to create a complex hardware testing environment according to the hardware interface of the real device to be tested, thus simplifying the test flow, improving the test efficiency and reducing the development cost of the real device.

It should be understood by those skilled in the art that embodiments of the present disclosure may be provided as a method, a system, or a computer program product. Accordingly, the present disclosure may take the form of an entirely hardware embodiment, an entirely software embodiment or an embodiment combining software and hardware aspects. Moreover, the present disclosure may take the form of a computer program product embodied in one or more computer readable media (including but not limited to disk storage, a CD-ROM, an optical memory, etc.) storing computer usable program codes.

The present disclosure is described with reference to the flowcharts and/or block diagrams of the method, device (system) and computer program product according to the embodiment of the present disclosure. It should be understood that each of the operations and/or blocks in the flowcharts and/or block diagram and a combination of the processes and/or blocks in the flowcharts and/or block diagrams may be implemented by computer program instructions. These computer program instructions may be provided to a processor of a general-purpose computer, a special purpose computer, an embedded processor or another programmable data processing apparatus to produce a machine, such that the instructions, when executed via the processor of the computer or another programmable data processing apparatus, create a device for implementing the functions specified in one or more operations of the flowcharts and/or in one or more blocks of the block diagrams.

These computer program instructions may also be stored in a computer readable medium that can direct a computer or another programmable data processing apparatus to function in a particular manner, such that the instructions stored in the computer readable medium produce an article of manufacture including instruction device which implements the functions specified in one or more operations of the flowcharts and/or in one or more blocks of the block diagrams.

The computer program instructions may also be loaded onto a computer or another programmable data processing apparatus to cause a series of operational steps to be performed by the computer or by the other programmable apparatus to produce a computer implemented process such that the instructions executed by the computer or the other programmable apparatus provide operations for implementing the functions specified in one or more operations of the flowcharts and/or in one or more blocks of the block diagrams.

While the present disclosure has been described with the optional embodiment, those skilled in the art knowing the underlying inventive concept can make other modifications and variations to the embodiment. Therefore, the appended claims are intended to be explained as including the optional embodiment as well as all the modifications and variations falling within the scope of this disclosure.

Obviously, those skilled in the art can make various modifications and variations to the embodiment of the present disclosure without departing from scope of the embodiment of the present disclosure. Thus, if these modifications and variations to the embodiment of the present disclosure fall within the scope of the claims of the present disclosure and the equivalents thereof, the present disclosure is intended to include these modifications and variations as well.

The invention claimed is:

1. A method for managing a field device based on a cloud server, applied to a device management system, the device management system at least comprising several clients, an access server and a cloud server; wherein the access server is configured to connect to real devices and register device information of the real devices with the cloud server; the cloud server is configured to maintain the device information of the real devices; the device management method comprising:
obtaining, by a client, a list of devices from the cloud server and selecting a target device to be managed from the list of devices; wherein the list of devices comprises the device information of real devices connected to the cloud server via the access server;
generating, by the client, a corresponding virtual device driver according to the device information of the target device, configuring a driver parameter of the virtual device driver, and sending the driver parameter to the access server via the cloud server to trigger the access server to configure an interface of the target device according to the driver parameter; and
determining, by the client, to establish a communication channel between the client and the target device upon reception of a configuration success message returned from the access server, and managing the target device according to the communication channel;
wherein generating, by the client, the corresponding virtual device driver according to the device information of the target device particularly comprises:
generating, by the client, the corresponding virtual device driver of the target device at least according to an interface type of and an interface number of the target device;
configuring, by the client, the driver parameter of the virtual device driver particularly comprises:
configuring, by the client, a baud rate of a serial interface of the virtual device driver corresponding to the target device when determining that the interface type of the target device is the serial interface; or,
configuring, by the client, an Internet Protocol (IP) address of a network card of the virtual device driver corresponding to the target device when determining that the interface type of the target device is the network card.

2. The method according to claim 1, wherein after selecting the target device to be managed from the list of devices by the client and before generating the corresponding virtual device driver according to the device information of the target device by the client, the method further comprises:
determining, by the client, a current state of the target device; wherein the current state of a real device indicates whether the real device is selected and managed by another client.

3. The method according to claim 1, wherein obtaining the list of devices from the cloud server by the client particularly comprises:
logging, by the client, into the cloud server; and
sending, by the client, a request for a list of devices to the cloud server to trigger the cloud server to perform the following operations: when determining that the client is valid, verifying validation of the client and sending to the client the device information of each real device connected to the cloud server via the access server and the client has right to manage.

4. The method according to claim 1, wherein sending, by the client, the driver parameter to the access server via the cloud server to trigger the access server to configure the interface of the target device according to the driver parameter particularly comprises:
encapsulating, by the client, the driver parameter according to a private protocol to obtain an encapsulated driver parameter, and sending the encapsulated driver parameter to the access server via the cloud server to trigger the access server to perform the following operations: decapsulating the received encapsulated driver parameter according to the private protocol to obtain the driver parameter, and configuring an interface in the access server connected to the target device according to the driver parameter.

5. The method according to claim 1, further comprising:
establishing, by the client, communication channels between the client and at least two target devices, respectively; and
implementing, by the client, data communications between any two of the at least two target devices based on the communication channels of the at least two target devices.

6. An apparatus for managing a field device based on a cloud server, comprising:
a transmitter;
a processor; and
a memory storing at least one instruction, wherein the processor is configured to execute the at least one instruction to:

obtain a list of devices from a cloud server;
select a target device to be managed from the list of devices; wherein the list of devices comprises device information of real devices connected to the cloud server via an access server;
generate a corresponding virtual device driver according to the device information of the target device;
configure a driver parameter of the virtual device driver;
control the transmitter to send the driver parameter to the access server via the cloud server to trigger the access server to configure an interface of the target device according to the driver parameter;
determine to establish a communication channel between the computing device and the target device upon reception of a configuration success message returned from the access server, and
manage the target device according to the communication channel;
wherein the processor is further configured to execute the at least one instruction to:
generate the corresponding virtual device driver of the target device at least according to an interface type of and an interface number of the target device;
configure a baud rate of a serial interface of the virtual device driver corresponding to the target device when the apparatus determines that the interface type of the target device is the serial interface; or, configure an Internet Protocol (IP) address of a network card of the virtual device driver corresponding to the target device when the apparatus determines that the interface type of the target device is the network card.

7. The apparatus according to claim 6, wherein after selecting the target device to be managed from the list of devices and before generating the corresponding virtual device driver according to the device information of the target device, the processor is further configured to execute the at least one instruction to:
determine a current state of the target device; wherein the current state of a real device indicates whether the real device is selected and managed by another apparatus.

8. The apparatus according to claim 6, wherein the processor is further configured to execute the at least one instruction to:
log into the cloud server; and
control the transmitter to send a request for the list of devices to the cloud server to trigger the cloud server to perform the following operations: when determining that the apparatus is valid verifying validation of the apparatus and sending to the apparatus the device information of each real device connected to the cloud server via the access server and the apparatus has right to manage.

9. The apparatus according to claim 6, wherein the processor is further configured to execute the at least one instruction to:
encapsulate the driver parameter according to a private protocol to obtain an encapsulated driver parameter and send the encapsulated driver parameter to the access server via the cloud server to trigger the access server to perform the following operations: decapsulating the received encapsulated driver parameter according to the private protocol to obtain the driver parameters and configuring an interface in the access server connected to the target device according to the driver parameter.

10. The apparatus according to claim 6, wherein the processor is further configured to execute the at least one instruction to:
establish communication channels between the apparatus and at least two target devices, respectively; and
implement data communication between any two of the at least two target devices based on the communication channels of the at least two target devices.

11. A non-transitory computer storage medium, storing at least one instruction, when the at least one instruction is executed by a computer, the at least one instruction causing the computer to:
obtain a list of devices from a cloud server and select a target device to be managed from the list of devices; wherein the list of devices comprises device information of real devices connected to the cloud server via an access server;
generate a corresponding virtual device driver according to the device information of the target device, configure a driver parameter of the virtual device driver, and send the driver parameter to the access server via the cloud server to trigger the access server to configure an interface of the target device according to the driver parameter; and
determine to establish a communication channel between the computer and the target device upon reception of a configuration success message returned from the access server, and manage the target device according to the communication channel;
wherein when the at least one instruction is executed by the computer, the at least one instruction further causes the computer to:
generate the corresponding virtual device driver of the target device at least according to an interface type of and an interface number of the target device;
configure a baud rate of a serial interface of the virtual device driver corresponding to the target device when determining that the interface type of the target device is the serial interface; or, configure an Internet Protocol (IP) address of a network card of the virtual device driver corresponding to the target device when determining that the interface type of the target device is the network card.

12. The non-transitory computer storage medium according to claim 11, wherein when the at least one instruction is executed by the computer, the at least one instruction further causes the computer to:
after selecting the target device to be managed from the list of devices and before generating the corresponding virtual device driver according to the device information of the target device, determine a current state of the target device; wherein the current state of a real device indicates whether the real device is selected and managed by a device other than the computer.

13. The non-transitory computer storage medium according to claim 11, wherein when the at least one instruction is executed by the computer, the at least one instruction further causes the computer to:
log into the cloud server; and
send a request for a list of devices to the cloud server to trigger the cloud server to perform the following operations: when determining that the client is valid, verifying validation of the computer and sending to the computer the device information of each real device connected to the cloud server via the access server and the client has right to manage.

14. The non-transitory computer storage medium according to claim 11, wherein when the at least one instruction is executed by the computer, the at least one instruction further causes the computer to:

encapsulate the driver parameter according to a private protocol to obtain an encapsulated driver parameter, and send the encapsulated driver parameter to the access server via the cloud server to trigger the access server to perform the following operations: decapsulating the received encapsulated driver parameter according to the private protocol to obtain the driver parameter, and configure an interface in the access server connected to the target device according to the driver parameter.

15. The non-transitory computer storage medium according to claim 11, wherein when the at least one instruction is executed by the computer, the at least one instruction further causes the computer to:
   establish communication channels between the computer and at least two target devices, respectively; and
   implement data communications between any two of the at least two target devices based on the communication channels of the at least two target devices.

* * * * *

UNITED STATES PATENT AND TRADEMARK OFFICE
CERTIFICATE OF CORRECTION

PATENT NO. : 11,075,821 B2  
APPLICATION NO. : 15/887888  
DATED : July 27, 2021  
INVENTOR(S) : Hang Huang It is certified that error appears in the above-identified patent and that said Letters Patent is hereby corrected as shown below:

On the Title Page

(73) The Assignee reads:  
"KYLAND TECHNOLOGY CO., LTD , Beijing, (CN)"  
Should read:  
-- KYLAND TECHNOLOGY CO., LTD , Beijing, (CN)  
CoreTek Systems Incorporated, Beijing, (CN) --

Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*